(12) United States Patent
Viehweg et al.

(10) Patent No.: US 7,881,680 B1
(45) Date of Patent: Feb. 1, 2011

(54) PREDICTIVE TRANSMITTER CALIBRATION

(75) Inventors: Frank Viehweg, Bruschal (DE); Devin Gharibian-Saki, Ettlingen (DE)

(73) Assignee: Marvell International Ltd., Hamilton (BM)

( * ) Notice: Subject to any disclaimer, the term of this patent is extended or adjusted under 35 U.S.C. 154(b) by 741 days.

(21) Appl. No.: 11/975,980

(22) Filed: Oct. 23, 2007

Related U.S. Application Data

(60) Provisional application No. 60/862,520, filed on Oct. 23, 2006.

(51) Int. Cl.
 *H04B 1/04* (2006.01)
 *H04K 1/02* (2006.01)

(52) U.S. Cl. .............. 455/114.3; 455/115.1; 455/127.2; 455/67.13; 375/296

(58) Field of Classification Search .............. 455/114.1, 455/114.2, 114.3, 115.1, 126, 127.2, 67.13; 375/296, 297
See application file for complete search history.

(56) References Cited

U.S. PATENT DOCUMENTS

| | | | | | |
|---|---|---|---|---|---|
| 5,049,832 | A | * | 9/1991 | Cavers | 330/149 |
| 5,778,029 | A | * | 7/1998 | Kaufmann | 375/296 |
| 5,862,460 | A | * | 1/1999 | Rich | 455/116 |
| 5,867,065 | A | * | 2/1999 | Leyendecker | 330/149 |
| 5,959,500 | A | * | 9/1999 | Garrido | 330/151 |
| 6,011,434 | A | * | 1/2000 | Sakai | 330/151 |
| 6,141,390 | A | * | 10/2000 | Cova | 375/297 |
| 6,255,908 | B1 | * | 7/2001 | Ghannouchi et al. | 330/149 |
| 6,373,902 | B1 | * | 4/2002 | Park et al. | 375/296 |
| 6,731,168 | B2 | * | 5/2004 | Hedberg et al. | 330/149 |
| 6,782,335 | B1 | * | 8/2004 | Lynaugh et al. | 702/107 |
| 6,798,843 | B1 | * | 9/2004 | Wright et al. | 375/296 |
| 6,996,378 | B2 | * | 2/2006 | Helms | 455/91 |
| 6,999,523 | B2 | * | 2/2006 | Posti | 375/296 |
| 7,109,792 | B2 | * | 9/2006 | Leffel | 330/149 |
| 7,183,847 | B2 | * | 2/2007 | Suzuki et al. | 330/149 |
| 2003/0053552 | A1 | * | 3/2003 | Hongo et al. | 375/295 |
| 2005/0162225 | A1 | * | 7/2005 | Suzuki et al. | 330/149 |
| 2007/0190952 | A1 | * | 8/2007 | Waheed et al. | 455/114.3 |
| 2008/0139141 | A1 | * | 6/2008 | Varghese et al. | 455/114.3 |

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

*Primary Examiner*—Duc M Nguyen

(57) ABSTRACT

Apparatus for calibrating a transmitter of a first integrated circuit, the transmitter being capable of transmitting a signal at N different transmit power levels based on N respective calibration values stored in the first integrated circuit, wherein N>1, the apparatus having corresponding methods, comprise: a power meter to measure a received power level of the signal transmitted at one of the N power levels; and a calibration circuit comprising an adjustment circuit to adjust the calibration value for the power level until the received power level of the signal falls within a predetermined range, and an offset circuit to replace each of the calibration values for the N−1 remaining transmit power levels based on the adjusted calibration value for the transmit power level and a respective predetermined offset from the adjusted calibration value.

10 Claims, 3 Drawing Sheets

U.S. PATENT DOCUMENTS

2009/0280758 A1* 11/2009 Pratt et al. ............... 455/127.2

OTHER PUBLICATIONS

IEEE P802.11g/D8.2, Apr. 2003 (Supplement to ANSI/IEEE Std 802.11-1999(Reaff 2003)); DRAFT Supplement to Standard [for] Information Technology—Telecommunications and information exchange between systems—Local and metropolitan area networks—Specific requirements—Part 11: Wireless LAN Medium Access Control (MAC) and Physical, Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std P802.11k/D2.0, Feb. 2005 (Draft Amendment to IEEE Std 802.11™, 1999 Edition Reaff 2003, as amended by IEEE Stds 802.11a™-1999, 802.11b™-1999, 802.11b™-1999/Cor Jan. 2001, 802.11d™-2001, 802.11g™-2003, 802.11h™-2003, 802.11i™-2004); Draft Amendment to Standard For Information Technology—Telecommunications and Information Exchange Between Systems—LAN/MAN Specific Requirements; Part 11: Wireless Medium Access Control (MAC) and Physical layer (PHY) specifications; Amendment 7: Radio Resource Measurement; Sponsored by the IEEE 802 Committee of the IEEE Computer Society; 124 pages.

IEEE P802.11k™/D10.0, Nov. 2007; Draft Standard for Information Technology—Telecommunications and information exchange between systems—Local and metropolitan area networks—Specific requirements; Part 11: Wireless LAN Medium Access Control (MAC) and Physical layer (PHY) specifications; Amendment 1: Radio Resource Measurement of Wireless LAN's; Sponsor LAN/MAN Standards Committee of the IEEE Computer Society; 223 pages.

IEEE P802.11v/D1.02, Sep. 2007; Draft Standard for Information Technology—Telecommunications and information exchange between systems—Local and metropolitan area networks—Specific requirements; Part 11: Wireless LAN Medium Access Control (MAC) and Physical layer (PHY) specifications; Amendment 9: Wireless Network Management; Prepared by the 802.11 Working Group of the IEEE 802 Committee; 204 pages.

IEEE P802.11w™/D4.0, Nov. 2007; Draft Standard for Information Technology—Telecommunications and information exchange between systems—Local and metropolitan area networks—Specific requirements; Part 11: Wireless LAN Medium Access Control (MAC) and Physical layer (PHY) specifications; Amendment 5: Protected Management Frames; Prepared by: IEEE 802 Committee of the IEEE Computer Society; 63 pages.

IEEE P802.11i/D10.0, Apr. 2004 (Amendment to ANSI/IEEE Std 802.11®-1999 (2003 Reaff) edition as amended by IEEE Std 802.11g-2003 and IEEE Std 802.11h-2003); IEEE Standard for Information Technology—Telecommunications and information exchange between systems—Local and metropolitan area networks—Specific requirements; Part 11: Wireless Medium Access Control (MAC) and Physical layer (PHY) specifications; Amendment 6: Medium Access Control (MAC) Security Enhancements; Sponsor LAN/MAN Committee of the IEEE Computer Society; 186 pages.

IEEE P802.11e/D11.0, Oct. 2004 (Amendment to ANSI/IEEE Std 802.11®-1999 (2003 Reaff) edition as amended by IEEE Std 802.11g-2003, IEEE Std 802.11h-2003 and IEEE 802.11i-2004); IEEE Standard for Information Technology—Telecommunications and information exchange between systems—Local and metropolitan area networks—Specific requirements; Part 11: Wireless Medium Access Control (MAC) and Physical layer (PHY) specifications: Amendment 7: Medium Access Control (MAC) Quality of Service (QoS) Enhancements; Sponsor LAN/MAN Committee of the IEEE Computer Society; 195 pages.

IEEE P802.11e/D13.0, Jan. 2005 (Amendment to ANSI/IEEE Std 802.11®-1999 (2003 Reaff) edition as amended by IEEE Std 802.11g-2003, IEEE Std 802.11h-2003, IEEE 802.11i-2004 and IEEE 802.11j-2004); IEEE Standard for Information Technology—Telecommunications and information exchange between systems—Local and metropolitan area networks—Specific requirements; Part 11: Wireless LAN Medium Access Control (MAC) and Physical layer (PHY) specifications: Amendment: Medium Access Control (MAC) Quality of Service (QoS) Enhancements; Sponsor LAN/MAN Committee of the IEEE Computer Society; 203 pages.

* cited by examiner

PREDICTIVE TRANSMITTER CALIBRATION

This application claims the benefit of U.S. Provisional Patent Application Ser. No. 60/862,520, filed on Oct. 23, 2006, the disclosure thereof incorporated by reference herein in its entirety.

BACKGROUND

The present invention relates generally to signal transmission. More particularly, the present invention relates to predictive transmitter calibration.

In general, transmitters must be calibrated after manufacture to ensure that the transmitted power falls within ranges set by design, industry standards, and the like. For example, a wireless local-area network (WLAN) chip generally includes a register to store a calibration value for each of the multiple power levels at which the chip can transmit, and in each of the multiple frequency bands the chip employs. During calibration, in each channel, and for each power level, a receiver measures the power transmitted by the chip, and adjusts the respective calibration value to bring that power level within a predetermined range. Currently, this process must be repeated several times for each power level, for each frequency band, for each chip. The current calibration scheme is therefore expensive and time-consuming.

SUMMARY

In general, in one aspect, the invention features an apparatus for calibrating a transmitter of a first integrated circuit, the transmitter being capable of transmitting a signal at N different transmit power levels based on N respective calibration values stored in the first integrated circuit, wherein N>1, the apparatus comprising: a power meter to measure a received power level of the signal transmitted by the first integrated circuit at one of the N transmit power levels; and a calibration circuit comprising an adjustment circuit to adjust the calibration value for the one of the N transmit power levels until the received power level of the signal transmitted by the first integrated circuit at the one of the N transmit power levels falls within a predetermined range, and an offset circuit to replace each of the calibration values for the N−1 remaining transmit power levels based on the adjusted calibration value for the one of the N transmit power levels and a respective predetermined offset from the adjusted calibration value.

In some embodiments, the calibration offset values are determined based on power level measurements of a signal transmitted by a transmitter of a second one of the integrated circuits. Some embodiments comprise a power point selector to select the one of the N transmit power levels. In some embodiments, the transmitter of the first integrated circuit is capable of transmitting a signal at N different transmit power levels in each of a plurality of different frequency channels, wherein the apparatus further comprises: a channel selector to select the frequency channels. In some embodiments, the first integrated circuit is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, the invention features a method for calibrating a transmitter of a first integrated circuit, the transmitter being capable of transmitting a signal at N different transmit power levels based on N respective calibration values stored in the first integrated circuit, wherein N>1, the method comprising: measuring a received power level of the signal transmitted by the first integrated circuit at one of the N transmit power levels; and adjusting the calibration value for the one of the N transmit power levels until the received power level of the signal transmitted by the first integrated circuit at the one of the N transmit power levels falls within a predetermined range, and replacing each of the calibration values for the N−1 remaining transmit power levels based on the adjusted calibration value for the one of the N transmit power levels and a respective predetermined offset from the adjusted calibration value.

In some embodiments, the calibration offset values are determined based on power level measurements of a signal transmitted by a transmitter of a second one of the integrated circuits. Some embodiments comprise selecting the one of the N transmit power levels. In some embodiments, the transmitter of the first integrated circuit is capable of transmitting a signal at N different transmit power levels in each of a plurality of different frequency channels, wherein the method further comprises: selecting the frequency channels. In some embodiments, the first integrated circuit is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, the invention features an apparatus for calibrating a transmitter of a first integrated circuit, the transmitter being capable of transmitting a signal at N different transmit power levels based on N respective calibration values stored in the first integrated circuit, wherein N>1, the apparatus comprising: power meter means for measuring a received power level of the signal transmitted by the first integrated circuit at one of the N transmit power levels; and means for calibration comprising adjustment means for adjusting the calibration value for the one of the N transmit power levels until the received power level of the signal transmitted by the first integrated circuit at the one of the N transmit power levels falls within a predetermined range, and offset means for replacing each of the calibration values for the N−1 remaining transmit power levels based on the adjusted calibration value for the one of the N transmit power levels and a respective predetermined offset from the adjusted calibration value.

In some embodiments, the calibration offset values are determined based on power level measurements of a signal transmitted by a transmitter of a second one of the integrated circuits. Some embodiments comprise power point selector means for selecting the one of the N transmit power levels. In some embodiments, the transmitter of the first integrated circuit is capable of transmitting a signal at N different transmit power levels in each of a plurality of different frequency channels, wherein the apparatus further comprises: channel selector means for selecting the frequency channels. In some embodiments, the first integrated circuit is compliant with all or part of IEEE standard 802.11, including draft and approved amendments 802.11a, 802.11b, 802.11e, 802.11g, 802.11i, 802.11k, 802.11n, 802.11v, and 802.11w.

Some embodiments comprise a computer program executable on a processor for calibrating a transmitter of a first integrated circuit, the transmitter being capable of transmitting a signal at N different transmit power levels based on N respective calibration values stored in the first integrated circuit, wherein N>1, the computer program comprising: instructions for measuring a received power level of the signal transmitted by the first integrated circuit at one of the N transmit power levels; and instructions for adjusting the calibration value for the one of the N transmit power levels until the received power level of the signal transmitted by the first integrated circuit at the one of the N transmit power levels falls within a predetermined range, and instructions for replacing each of the calibration values for the N−1 remaining transmit power levels based on the adjusted calibration value for the one of the N transmit power levels and a respective predetermined offset from the adjusted calibration value.

In some embodiments, the calibration offset values are determined based on power level measurements of a signal transmitted by a transmitter of a second one of the integrated circuits. Some embodiments comprise instructions for selecting the one of the N transmit power levels. In some embodiments, the transmitter of the first integrated circuit is capable of transmitting a signal at N different transmit power levels in each of a plurality of different frequency channels, wherein the computer program further comprises: instructions for selecting the frequency channels. In some embodiments, the first integrated circuit is compliant with all or part of IEEE standard 802.11, including draft and approved amendments 802.11a, 802.11b, 802.11e, 802.11g, 802.11i, 802.11k, 802.11n, 802.11v, and 802.11w.

The details of one or more implementations are set forth in the accompanying drawings and the description below. Other features will be apparent from the description and drawings, and from the claims.

Figure 1:
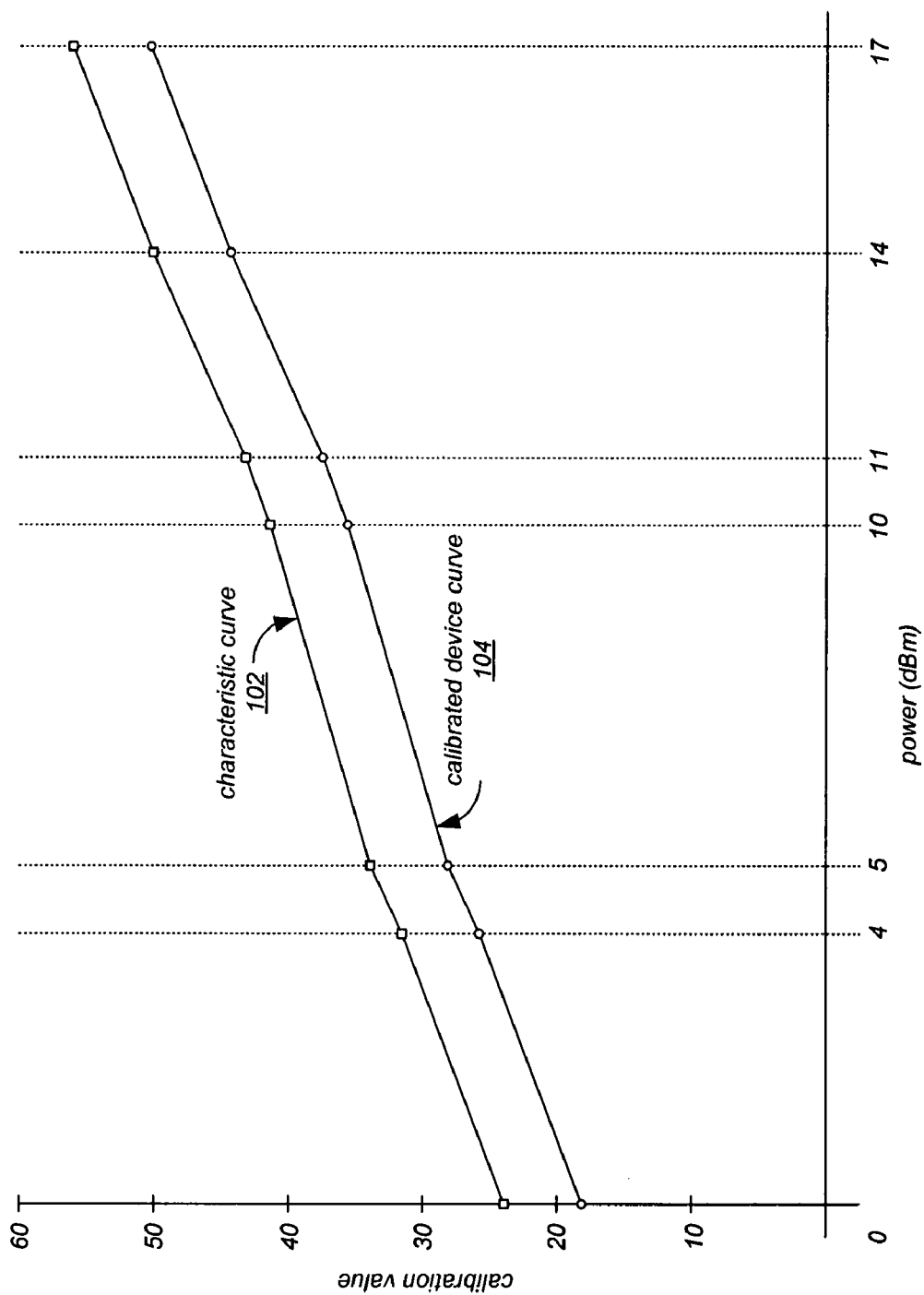
FIG. 1 shows plots of calibration values vs. power levels for a characteristic curve and a calibrated curve.

The leading digit(s) of each reference numeral used in this specification indicates the number of the drawing in which the reference numeral first appears.

DETAILED DESCRIPTION

Embodiments of the present invention provide predictive transmitter calibration techniques that are especially useful with integrated circuit transmitters such as WLAN chips. The inventors have discovered that, for a group of related chips, the relationship between calibration values and transmitted power exhibits a characteristic calibration curve that differs between the chips only in the value of the intercept of the curve with the calibration value axis. Based on this discovery, the inventors have developed a new calibration technique in which, once the characteristic curve has been established for a group of chips, only one power point on the curve need be determined for each chip during calibration. Then the remaining points on the curve can be calculated rather than measured. For example, the calibration value offsets between the power points on the characteristic curve can be determined and used to determine the calibration values for each chip during calibration. Thus multiple power levels for a chip can be calibrated by measuring only one of the power levels. For example, Table 1 shows a table of power levels, calibration values, and offsets characteristic of an example group of chips.

TABLE 1

| Power (dBm) | Calibration value | Offset |
|---|---|---|
| 0 | 0x18 | — |
| 4 | 0x20 | 0x20-0x18 = 8 |

TABLE 1-continued

| Power (dBm) | Calibration value | Offset |
|---|---|---|
| 5 | 0x22 | 0x22-0x20 = 2 |
| 10 | 0x2A | 0x2A-0x22 = 8 |
| 11 | 0x2D | 0x2D-0x2A = 3 |
| 14 | 0x32 | 0x32-0x2D = 5 |
| 17 | 0x39 | 0x39-0x32 = 7 |

In the example of Table 1, each offset is calculated as the difference in the calibration values between the current power point and the previous power point. Of course, the offsets can be calculated in other ways. For example, all of the offsets could be referenced to the same power point, and the like. The characteristic data of Table 1 can be obtained by calibrating a statistically significant number of the chips in a group by conventional measurement methods, and compiling the calibration values to obtain the calibration value offsets shown in Table 1.

Table 2 shows a table of power levels and calibration values calculated for a single chip from the group of chips characterized by Table 1.

TABLE 2

| Power (dBm) | Calibration value |
|---|---|
| 0 | 0x12 (measured) |
| 4 | 0x12 + 8 = 0x1A |
| 5 | 0x1A + 2 = 0x1C |
| 10 | 0x1C + 8 = 0x24 |
| 11 | 0x24 + 3 = 0x27 |
| 14 | 0x27 + 5 = 0x3C |
| 17 | 0x3C + 7 = 0x43 |

Referring to Table 2, only a single power point (0 dBm) has been calibrated by conventional measurement techniques, resulting in a calibration value of 0×12 for that power point. The remaining calibration values in Table 2 have been calculated using the that calibration value and the offsets from Table 1. For example, the calibration value for the second power point (4 dBm) is calculated by adding the offset for that power point from Table 1 (8) to the measured calibration value (0×12) of the previous power point (0 dBm) to yield 0×12+8=0x1A. FIG. 1 shows plots of calibration values vs. power levels for both the characteristic curve 102 of Table 1 and the calibrated curve 104 for the chip of Table 2. Note that the only significant difference in the curves is the value of the intercept with the calibration value axis.

Figure 2:
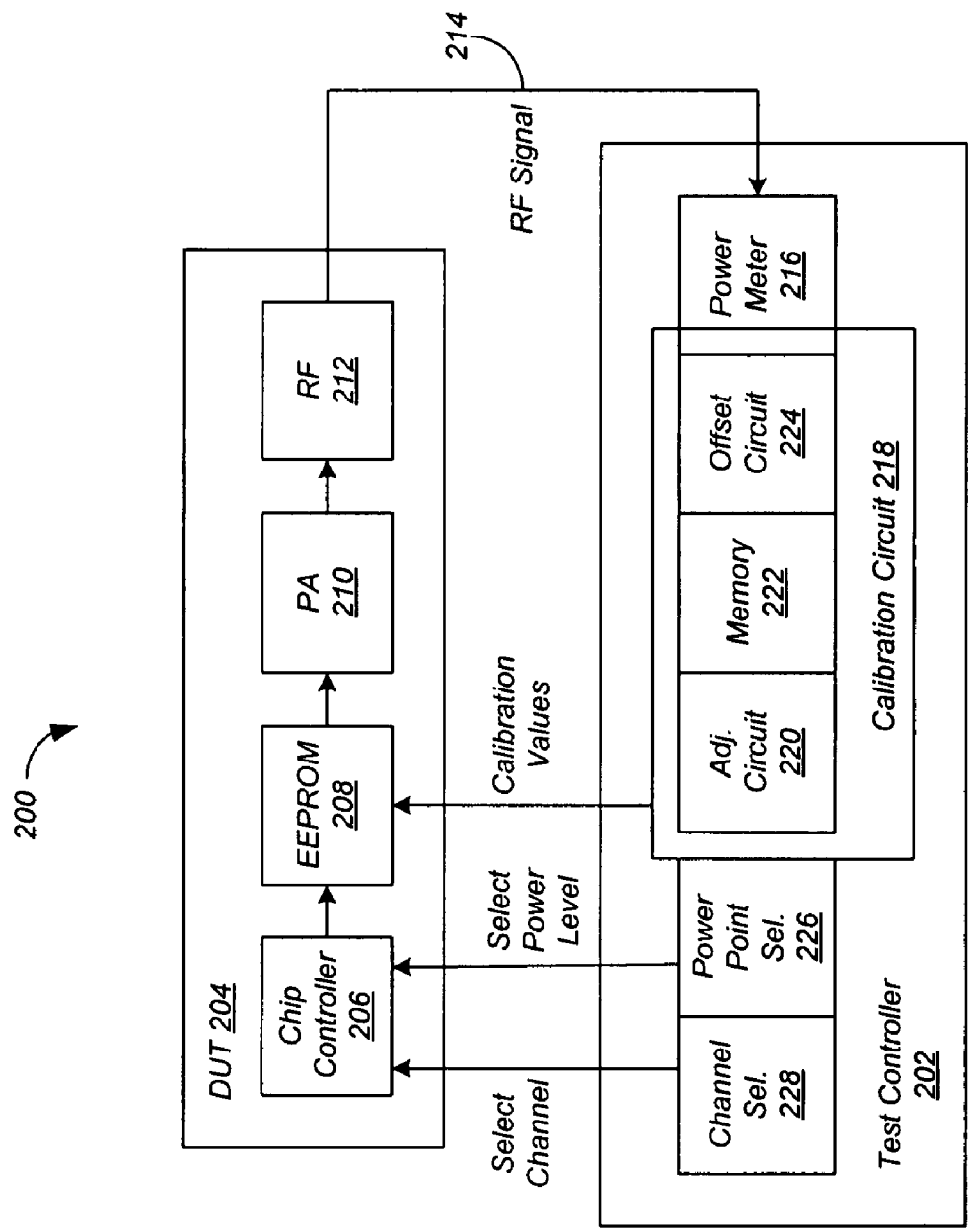
FIG. 2 shows a WLAN chip calibration system comprising a test controller in communication with a device-under-test according to some embodiments of the present invention.

FIG. 2 shows a WLAN chip calibration system 200 comprising a test controller 202 in communication with a device-under-test (DUT) 204 according to some embodiments of the present invention. DUT 204 can be compliant with all or part of IEEE standard 802.11, including draft and approved amendments such as 802.11a, 802.11b, 802.11e, 802.11g, 802.11i, 802.11k, 802.11n, 802.11v, and 802.11w. But while embodiments of the present invention are described with respect to calibrating WLAN chips, they are also applicable to calibrating other sorts of transmitters, and are not limited to integrated circuit transmitters or wireless communications.

Although in the described embodiments, the elements of test controller 202 are presented in one arrangement, other embodiments may feature other arrangements, as will be apparent to one skilled in the relevant arts based on the disclosure and teachings provided herein. For example, the elements of test controller 202 can be implemented in hardware, software, or combinations thereof.

Referring to FIG. 2, DUT 204 includes a chip controller 206 to control DUT 204, an electrically-erasable programmable read-only memory (EEPROM) 208 to store calibration values, for example as a look-up table, a power amplifier (PA) 210 to amplify a signal according to the calibration values stored in EEPROM 208, and an RF section 212 to generate an RF signal 214 based on the amplified signal. Test controller 202 includes a power meter 216 to measure power levels of RF signal 214, and a calibration circuit 218 to modify the calibration values stored in EEPROM 208 of DUT 204.

Calibration circuit 218 includes an adjustment circuit 220, a memory 222, and an offset circuit 224. Adjustment circuit 220 adjusts a calibration value stored in EEPROM 208 of DUT 204 based on power level measurements of RF signal 214. Memory 222 stores calibration value offsets for a characteristic curve for a group of devices including DUT 204, for example such as the offsets of Table 1. Offset circuit 224 calculates calibration values based on the calibration value determined by adjustment circuit 220 and the offsets stored in memory 222.

Test controller 202 can also include a power point selector 226 and a channel selector 228. Power point selector 226 selects the power points for calibration of DUT 204. Channel selector 228 selects frequency channels for calibration when DUT 204 can transmit in multiple frequency channels.

Figure 3:
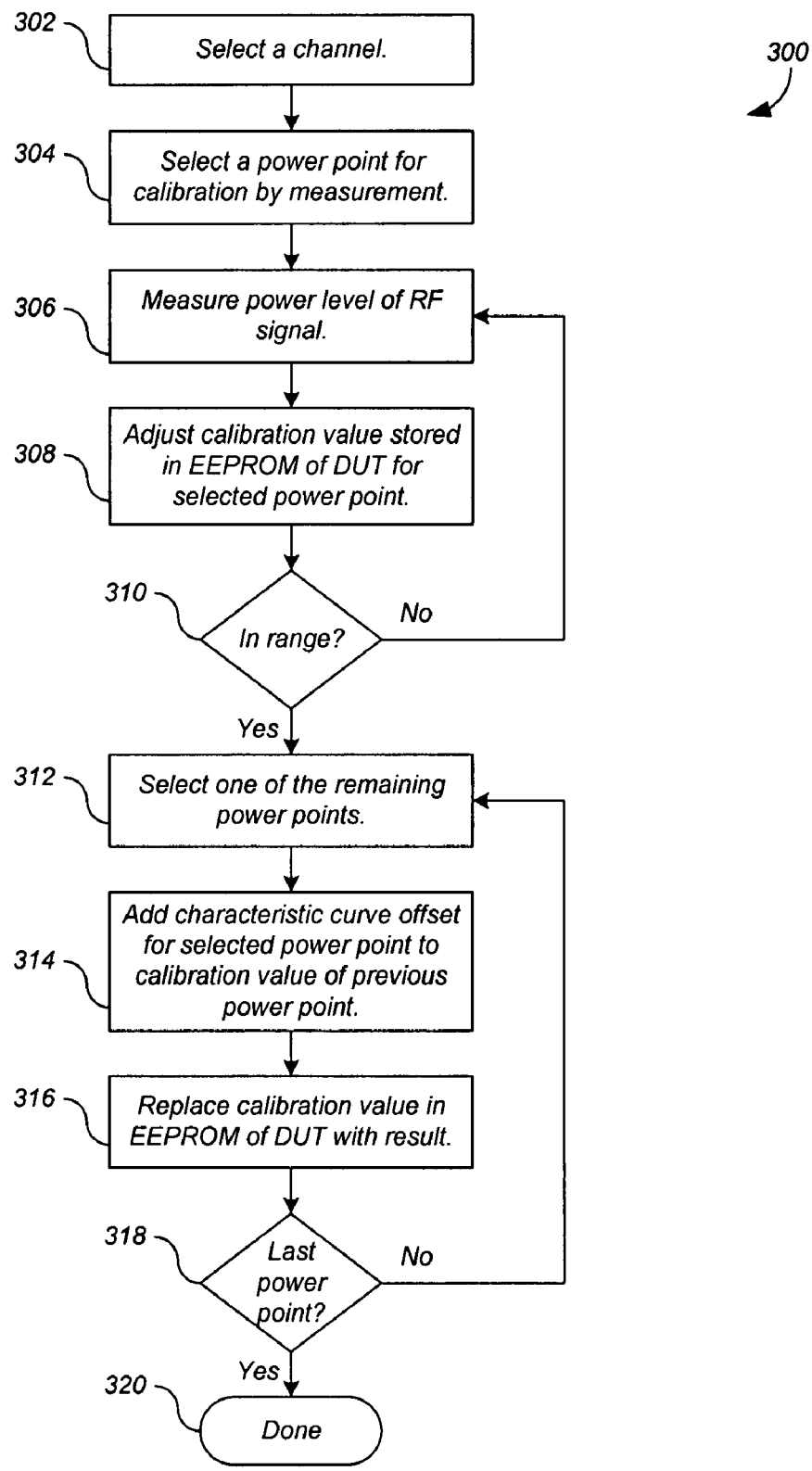
FIG. 3 shows a process for the WLAN chip calibration system of FIG. 2 according to some embodiments of the present invention.

FIG. 3 shows a process 300 for WLAN chip calibration system 200 of FIG. 2 according to some embodiments of the present invention. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

In calibration process 300, test controller 202 first calibrates a power point by measurement of RF signal 214, and then calibrates the remaining power points, without measurement of RF signal 214, by calculations using the calibrated power point and data describing a characteristic curve for DUT 204. Referring to FIG. 3, in embodiments wherein DUT 204 can transmit on multiple frequency channels, channel selector 228 selects one of the channels for calibration (step 302). Power point selector 226 of test controller 202 selects a power point for calibration by measurement (step 304). In response, chip controller 206 of DUT 204 causes DUT 204 to transmit RF signal 214 at the selected power point and channel. In the described embodiments, the power point selected for calibration by measurement is 0 dBm, but of course, another power point can be selected instead. In addition, while only one power point is calibrated by measurement in the described embodiments, multiple power points can be calibrated in this way.

Power meter 216 of test controller 202 measures the power level of RF signal 214 (step 306). Adjustment circuit 220 calibrates the selected power point of DUT 204 by adjusting the calibration value stored in EEPROM 208 of DUT 204 for the power point (step 308). Steps 306 and 308 are repeated until the received power level of RF signal 214 transmitted by DUT 204 falls within the predetermined calibration range for the power point (step 310).

Calibration circuit 218 then calibrates the remaining power points of DUT 204 by calculation, without measurement of RF signal 214. In particular, offset circuit 224 selects one of the remaining power points (step 312), adds the characteristic curve offset for that power point (stored in memory 222) to the calibration value of the previous power point (step 314), and replaces the calibration value in EEPROM 208 of DUT 204 with the result (step 316). For example, offset circuit 224 generates the calibration values shown in Table 2 above.

Process 300 then calculates the calibration value for the next power point in the channel in a similar manner (returning to step 312). When no power points remain in the selected channel (step 318), calibration process 300 is done (step 320).

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus for calibrating a transmitter of a first integrated circuit, the transmitter being capable of transmitting a signal at N different transmit power levels based on N respective calibration values stored in the first integrated circuit, wherein N>1, the apparatus comprising:
   a power meter to measure a received power level of the signal transmitted by the first integrated circuit at one of the N transmit power levels; and
   a calibration circuit comprising:
      an adjustment circuit to adjust the calibration value for the one of the N transmit power levels until the received power level of the signal transmitted by the first integrated circuit at the one of the N transmit power levels falls within a predetermined range, and
      an offset circuit to replace each of the calibration values for the N−1 remaining transmit power levels based on the adjusted calibration value for the one of the N transmit power levels and a respective predetermined offset from the adjusted calibration value.

2. The apparatus of claim 1:
wherein the calibration offset values are determined based on power level measurements of a signal transmitted by a transmitter of a second one of the integrated circuits.

3. The apparatus of claim 1, further comprising:
a power point selector to select the one of the N transmit power levels.

4. The apparatus of claim 1, wherein the transmitter of the first integrated circuit is capable of transmitting a signal at N different transmit power levels in each of a plurality of different frequency channels, wherein the apparatus further comprises:
a channel selector to select the frequency channels.

5. The apparatus of claim 1, wherein the first integrated circuit is compliant with all or part of IEEE standard 802.11, including draft and approved amendments 802.11a, 802.11b, 802.11e, 802.11g, 802.11i, 802.11k, 802.11n, 802.11v, and 802.11w.

6. A method for calibrating a transmitter of a first integrated circuit, the transmitter being capable of transmitting a signal at N different transmit power levels based on N respective calibration values stored in the first integrated circuit, wherein N>1, the method comprising:
measuring a received power level of the signal transmitted by the first integrated circuit at one of the N transmit power levels; and
adjusting the calibration value for the one of the N transmit power levels until the received power level of the signal transmitted by the first integrated circuit at the one of the N transmit power levels falls within a predetermined range, and
replacing each of the calibration values for the N−1 remaining transmit power levels based on the adjusted calibration value for the one of the N transmit power levels and a respective predetermined offset from the adjusted calibration value.

7. The method of claim 6:
wherein the calibration offset values are determined based on power level measurements of a signal transmitted by a transmitter of a second one of the integrated circuits.

8. The method of claim 6, further comprising:
selecting the one of the N transmit power levels.

9. The method of claim 6, wherein the transmitter of the first integrated circuit is capable of transmitting a signal at N different transmit power levels in each of a plurality of different frequency channels, wherein the method further comprises:
selecting the frequency channels.

10. The method of claim 6, wherein the first integrated circuit is compliant with all or part of IEEE standard 802.11, including draft and approved amendments 802.11a, 802.11b, 802.11e, 802.11g, 802.11i, 802.11k, 802.11n, 802.11v, and 802.11w.

* * * * *